US010440647B2

(12) United States Patent
Park et al.

(10) Patent No.: US 10,440,647 B2
(45) Date of Patent: *Oct. 8, 2019

(54) SYSTEM AND METHOD FOR ENABLING LOW POWER DEVICES

(71) Applicant: INTEL CORPORATION, Santa Clara, CA (US)

(72) Inventors: Minyoung Park, San Ramon, CA (US); Robert J. Stacey, Portland, OR (US); Emily H. Qi, Gig Harbor, WA (US)

(73) Assignee: INTEL CORPORATION, Santa Clara, CA (US)

(*) Notice: Subject to any disclaimer, the term of this patent is extended or adjusted under 35 U.S.C. 154(b) by 65 days.

This patent is subject to a terminal disclaimer.

(21) Appl. No.: 15/200,886

(22) Filed: Jul. 1, 2016

(65) Prior Publication Data
US 2017/0127351 A1 May 4, 2017

Related U.S. Application Data

(63) Continuation of application No. 13/997,236, filed as application No. PCT/US2011/065207 on Dec. 15, 2011, now Pat. No. 9,398,529.

(51) Int. Cl.
*H04W 52/02* (2009.01)
*H04W 74/06* (2009.01)
*H04W 84/12* (2009.01)

(52) U.S. Cl.
CPC ... *H04W 52/0216* (2013.01); *H04W 52/0209* (2013.01); *H04W 74/06* (2013.01); *H04W 84/12* (2013.01); *Y02D 70/00* (2018.01); *Y02D 70/142* (2018.01); *Y02D 70/144* (2018.01); *Y02D 70/146* (2018.01); *Y02D 70/168* (2018.01)

(58) Field of Classification Search
None
See application file for complete search history.

(56) References Cited

U.S. PATENT DOCUMENTS

| 7,623,448 B1* | 11/2009 | Vrzic | H04W 74/02 370/230 |
| 2005/0135409 A1* | 6/2005 | Janczak | H04W 74/06 370/449 |

(Continued)

*Primary Examiner* — Chi H Pham
*Assistant Examiner* — Vladislav Y Agureyev

(57) ABSTRACT

Various embodiments are directed to a wireless access point capable of reserving a wireless communication channel by sending a quiet message to multiple legacy devices. The quiet message may include data identifying periodic quiet durations during which the legacy devices cannot access the wireless communication channel. The wireless access point may send a polling schedule to the multiple low power wireless devices. The polling schedule may include data identifying the periodic quiet durations. The wireless access point may then poll the multiple low power wireless devices during the periodic quiet durations. The low power wireless devices can exchange data with the wireless access point during the quiet durations. The quiet message sent to the legacy devices guarantees that the legacy devices will not use the specified channel during the quiet durations. Thus, communications with the low power wireless devices may occur without interference from the legacy devices.

25 Claims, 4 Drawing Sheets

(56) References Cited

U.S. PATENT DOCUMENTS

| | | | |
|---|---|---|---|
| 2005/0136913 A1* | 6/2005 | Kampen | H04W 52/0216 455/426.2 |
| 2009/0022078 A1* | 1/2009 | Patterson | G01D 21/00 370/311 |
| 2010/0097951 A1* | 4/2010 | Espina Perez | H04L 67/125 370/252 |
| 2010/0150116 A1* | 6/2010 | Ji | H04W 74/0875 370/338 |
| 2010/0284380 A1* | 11/2010 | Banerjee | H04W 16/14 370/338 |
| 2011/0069650 A1* | 3/2011 | Singh | H04W 52/0206 370/311 |
| 2011/0103280 A1* | 5/2011 | Liu | H04W 52/0229 370/311 |
| 2013/0044658 A1* | 2/2013 | Zhu | H04W 52/0229 370/311 |
| 2013/0070605 A1* | 3/2013 | Ghosh | H04W 72/082 370/241 |
| 2013/0077610 A1* | 3/2013 | Amini | H04W 52/0216 370/338 |

* cited by examiner

SYSTEM AND METHOD FOR ENABLING LOW POWER DEVICES

CROSS-REFERENCE TO RELATED APPLICATIONS

This application is a continuation of, claims the benefit of and priority to, previously filed U.S. patent application Ser. No. 13/997,236 entitled "SYSTEM AND METHOD FOR ENABLING LOW POWER DEVICES" filed on Jun. 22, 2013, which is a national phase application of, and claims priority to, International Patent Application Serial No. PCT/US2011/065207 entitled "SYSTEM AND METHOD FOR ENABLING LOW POWER DEVICES" filed on Dec. 15, 2011, the subject matter of which are hereby incorporated herein by reference in their respective entireties.

BACKGROUND

Local area networks, such as the Institute of Electrical and Electronics Engineers (IEEE) 802.11 (WiFi) networks, are comprised of devices that utilize relatively large amounts of bandwidth and power. For very low power wireless devices such as sensors, it is impractical to communicate over a WiFi network due to the power requirements associated with large bandwidth transmissions. Low power devices typically do not transfer large amounts of data and do not need to utilize large amounts of bandwidth to operate. The base channel bandwidth for WiFi devices operating in the 2.4 and 5 GHz bands is approximately 20 MHz and the lowest data throughput rate is approximately 6 Mbps (million bits per second) for the IEEE 802.11g and 802.11n standards. WiFi is well suited for high data rate transfers but it consumes too much power for smaller low power sensor or peripheral devices. Narrowing the channel bandwidth and lowering the data rate would reduce power consumption for low power devices but may create coexistence problems with the higher power consuming legacy WiFi devices operating on the network. Accordingly, there may be a need for improved techniques to solve these and other problems.

DETAILED DESCRIPTION

Figure 1:
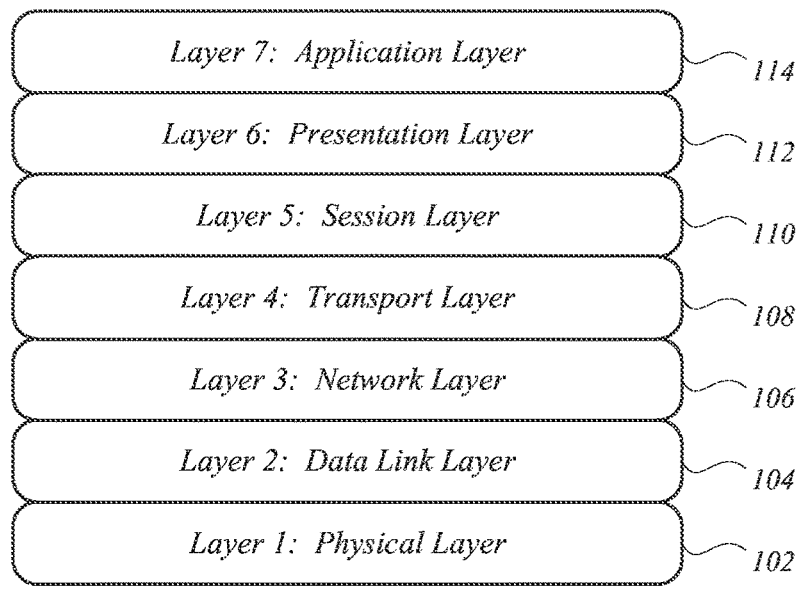
FIG. 1 illustrates an embodiment of an example OSI stack for a communications system.

WiFi is a mechanism for wirelessly connecting electronic devices using the Institute for Electrical and Electronics Engineers (IEEE) 802.11 family of standards. A WiFi network is typically comprised of multiple devices that communicate with one another and/or an external network. IEEE 802.11 is a set of standards for implementing Wireless Local Area Network (WLAN) computer communication in the 2.4 and 5 GHz frequency bands. Since most WLANs are also based on IEEE 802.11 standards the terms Wi-Fi network and WLAN may be treated as synonymous in this disclosure.

For purposes of this disclosure, certain WiFi devices may be termed legacy devices. A legacy device represents a device capable of wireless communication over a WiFi network according to the rules and protocols of the network (e.g., 802.11 communications). The rules define many of the conditions for wireless communication including bandwidth allocations, modulation/coding schemes, etc. Legacy devices typically utilize relatively large amounts of bandwidth and power. For instance, the base channel bandwidth for legacy devices operating in the 2.4 and 5 GHz bands is approximately 20 MHz and the lowest data throughput rate is approximately 6 Mbps for the 802.11g and 802.11n standards.

Another of the devices in the WiFi network may be termed a wireless access point. The wireless access point may function as a controller. In various embodiments, a wireless access point may address the challenges faced by low power wireless devices operating on higher power WiFi networks. The wireless access point may be responsible for setting up wireless data channels and managing data communications among network devices. A wireless access point may include, but is not limited to, a controller, a router, an ethernet switch, and a broadband modem. The controller component may handle automatic adjustments to radio frequency (RF) power, channel allocations, authentication, and security for the WiFi network.

According to embodiments, a wireless access point may reserve a wireless communication channel by sending a quiet message to one or more legacy devices operating on the WiFi network. The quiet message may include data identifying periodic quiet durations during which the legacy devices cannot access the wireless communication channel. The quiet durations may reserve the channel for communications to and from one or more low power wireless devices. The wireless access point may send a polling schedule to one or more low power wireless devices. The polling schedule may include data identifying the periodic quiet durations. The wireless access point may then poll the one or more low power wireless devices during the periodic quiet durations. The low power wireless devices can exchange data with the wireless access point during the quiet durations. The quiet message sent to the legacy devices guarantees that the legacy devices will not access the specified channel during the quiet durations. Thus, communications with the low power wireless devices may occur without interference from the legacy devices during the quiet durations. When not in a quiet duration, the low power wireless devices may enter a sleep state.

The low power wireless devices may communicate with the wireless access point over a new Physical Layer (PHY) that uses a substantially narrower wireless communication channel bandwidth than the legacy devices use to communicate with the wireless access point. In 802.11 communications, the PHY is the air interface between the wireless access point and the wireless devices and defines the manner with which the devices communicate.

A legacy device may utilize up to 20 MHz of bandwidth to communicate with the wireless access point while a low power wireless device may need only 1-2 MHz to accomplish its functions. The low power wireless devices may also utilize a simpler modulation/coding scheme than the legacy devices use to communicate with the wireless access point. The legacy devices may use higher data rate modulation/ coding schemes such as Direct Sequence Spread Spectrum (DSSS), Orthogonal Frequency Division Multiplexing (OFDM), Multiple In, Multiple Out Orthogonal Frequency Division Multiplexing (MIMO-OFDM), Binary Phase Shift Keying (BPSK), Differential Binary Phase Shift Keying (DBPSK), Quadrature Phase Shift Keying (QPSK), Differential Quadrature Phase Shift Keying (DQPSK), or 16-State Quadrature Amplitude Modulation (16-QAM). The low power wireless devices, by contrast, may use a simplified coding scheme such as Frequency Shift Keying (FSK) or Gaussian Frequency Shift Keying (GFSK).

The simpler modulation/coding schemes mean that the low power wireless devices do not achieve data rates as high as the legacy wireless devices. This is not an issue because the low power wireless devices do not transmit nearly as much data as the legacy wireless devices and do not require nearly as much throughput capability. For example, the base channel bandwidth is 20 MHZ wide and the lowest data rate is 6 Mbps for 802.11g/n. By utilizing a narrower channel bandwidth and lower data rate (e.g., significantly less than 6 Mbps) the low power wireless devices use substantially less power than the legacy devices and can afford, from a power perspective, to use the WiFi network. The quiet message provides dedicated time periods in which the higher powered legacy devices may not occupy the reserved channel. Since the low power wireless devices do not have to vie for the channel with the legacy devices they can co-exist on the WiFi network with the legacy devices even though they use a different PHY to communicate with the wireless access point.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates the Open Systems Interconnection model (OSI model) for characterizing and standardizing the functions of a communications system in terms of seven (7) abstraction layers. The physical layer 102 may define electrical and physical specifications for devices including modulation schemes and data throughput rates. The embodiments described herein may utilize a different physical layer 102 for low power devices than it does for legacy devices within a WiFi network.

The data link layer 104 may provide the functional and procedural means to transfer data between network entities and to detect and possibly correct errors that may occur in the physical layer 102. The network layer 106 may provide the functional and procedural means of transferring variable length data sequences from a source host on one network to a destination host on a different network. This is in contrast to the data link layer 104 which connects hosts within the same network. The transport layer 108 may provide transparent transfer of data between end users, providing reliable data transfer services to the upper layers. The session layer 110 may control the dialogues (connections) between computers. The session layer 110 may establish, manage and terminate the connections between the local and remote application. The presentation layer 112 may transform data into a form that the application accepts. The presentation layer 112 may also format and encrypt data to be sent across a network. The application layer 114 may interact with software applications that implement a communicating component.

Figure 2:
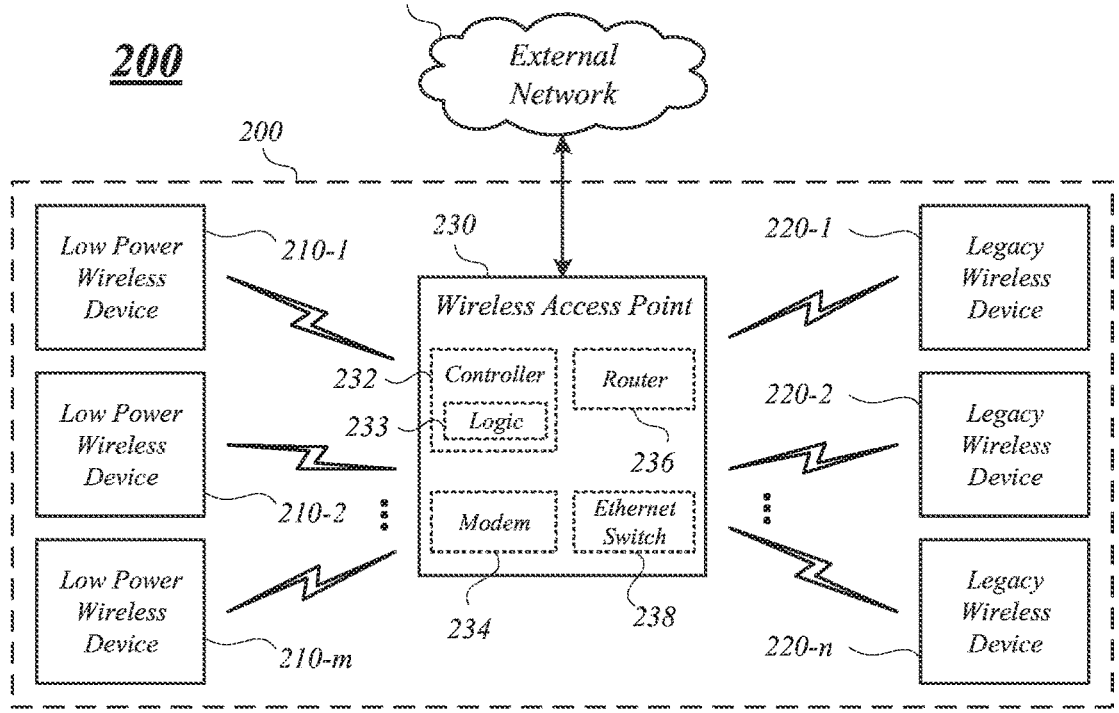
FIG. 2 illustrates an embodiment of an example WiFi network.

FIG. 2 illustrates an embodiment of an example WiFi network 200. The WiFi network 200 may be under the control of a wireless access point 230. The wireless access point 230 may include a controller component 232, a modem component 2344, a router component 2366, and a switch component 2388. For example, modem component 234 may be a wireless transceiver having RF components similar to modem 758 described with reference to FIG. 7.

The controller component 232 may handle automatic adjustments to radio-frequency (RF) power, channel allocations, authentication, and security for the WiFi network 200 and multiple low power wireless devices 210-$m$ and multiple legacy wireless devices 220-$n$. The controller component 232 may be responsible for setting up wireless data channels and managing data communications among the multiple low power wireless devices 210-$m$ and multiple legacy wireless devices 220-$n$. The controller component 232 may also include logic 233 to carry out the responsibilities of the controller component 232 such as, for instance, exchanging messages with the multiple low power wireless devices 210-$m$ and multiple legacy wireless devices 220-$n$.

The wireless access point 230 may also be communicatively coupled with an external network 240. The multiple low power wireless devices 210-$m$ and multiple legacy wireless devices 220-$n$ may be communicable with the external network 240 via the modem component 234.

In the WiFi network 200 of FIG. 2, a router component 236 may pass data, (e.g., web pages and email) between a WiFi legacy device 220-$n$ and the modem component 234 for communications involving external network 240. A router is a device that forwards data packets between computer networks. By contrast, a network switch, such as an IEEE 802.3 (Ethernet) switch, is a small hardware device that joins multiple devices together within one local area network (LAN). Switches are incapable of joining multiple networks or sharing an Internet connection. In one embodiment, the switch component 238 may be an Ethernet switch arranged to communicatively couple the multiple low power wireless devices 210-$m$ and multiple legacy wireless devices 220-$n$ within the WiFi network 200.

The multiple low power wireless devices 210-$m$ may be characterized by their utilization of a second different PHY having a narrower channel bandwidth and lower data rate than that typically associated with a WiFi network utilizing a first PHY that may be associated with the 802.11 family of standards. By using less bandwidth and a lower data rate, the multiple low power wireless devices 210-$m$ may use significantly less power than the legacy wireless devices 220-$n$. Examples of low power wireless devices 210-$m$ may include various sensor devices.

The multiple legacy wireless devices 220-$n$ may be characterized by their utilization of PHYs that comprise standard channel bandwidth, data rates, and modulation schemes associated with a WiFi network operating under the 802.11 family of standards. Examples of legacy wireless devices 220-$n$ may include, but are not limited to WiFi enabled personal computers, notebook computers, tablet computers, smart phones, printers, digital cameras, and other WiFi enabled electronic devices.

In order to provide ensure that the low power wireless devices 210-$m$ can successfully operate on the WiFi network, measures are taken to allow the low power wireless devices 210-$m$ and the legacy wireless devices 220-$n$ to co-exist. Co-existence may be an issue because the low power wireless devices 210-*m* utilize a narrower bandwidth and a lower data rate than normal 802.11 communications. The narrower bandwidth and a lower data rate mean that the low power wireless devices 210-*m* may utilize a different PHY or air interface than the legacy wireless devices 220-*n*.

Figure 3:
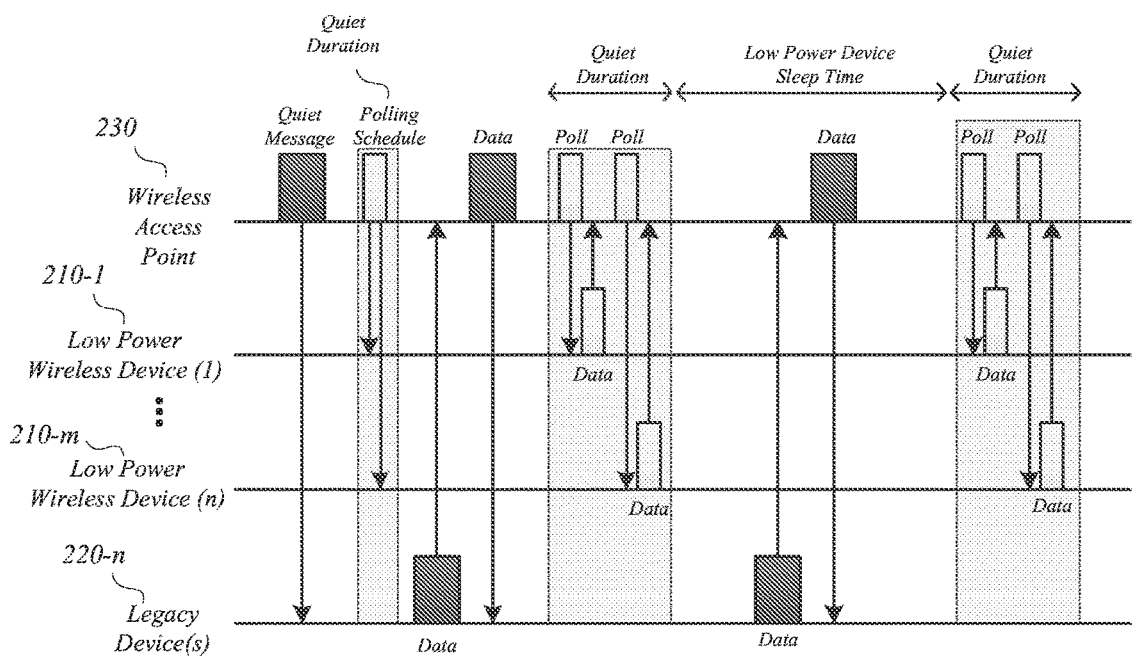
FIG. 3 illustrates an embodiment of a communications timeline.

FIG. 3 illustrates a communications timeline according to an embodiment of the disclosure. The wireless access point 230 may manage communications among the multiple low power wireless devices 210-*m* and the legacy wireless devices 220-*n* within the WiFi network 200. Because of the different PHYs used by the low power wireless devices 210-*m* and legacy wireless devices 220-*n*, a timing scheme that prevents the legacy wireless devices 220-*n* from using the channel at the same time as the low power wireless devices 210-*m* is needed.

The wireless access point 230 may sense and reserve a channel on behalf of the low power sensor devices 210-*m*. The wireless access point 230 may use a quiet message to reserve the channel for communications between the wireless access point 230 and the low power wireless devices 210-*m*.

Figure 4:
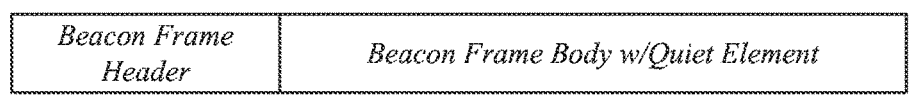
FIG. 4 illustrates an embodiment of a beacon management frame.

In one embodiment, the quiet message may take the form of a quiet element included as part of a beacon frame as shown in FIG. 4. The beacon frame is an 802.11 management frame that is sent periodically from the wireless access point 230 to announce its presence and provide the Service Set Identifier (SSID) and other parameters to wireless devices within range of the WiFi network 200 associated with the wireless access point 230. The SSID is a name that identifies a particular 802.11 WLAN or WiFi network. The quiet element may be one of the parameters included in the beacon frame. The quiet element may define a periodic quiet duration during which period the legacy wireless devices 220-*n* may not access the channel. The embodiments are not limited to this example.

Figure 5:
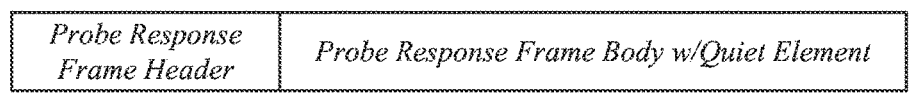
FIG. 5 illustrates an embodiment of a probe response management frame.

In one embodiment, the quiet message may take the form of a quiet element included as part of a probe response frame as shown in FIG. 5. The probe response frame is an 802.11 management frame that is sent from the wireless access point 230 containing capability information, supported data rates and other parameters to wireless devices within range of the WiFi network 200 associated with the wireless access point 230. The quiet element may be one of the parameters included in the probe response frame. The quiet element may define a periodic quiet duration during which period the legacy wireless devices 220-*n* may not access the channel. The embodiments are not limited to this example.

The quiet message may be transmitted to the legacy wireless devices 220-*n* in a 20 MHz channel according to the rules of the 802.11 family of standards. Once the legacy wireless devices 220-*n* receive and process the quiet message, the legacy wireless devices 220-*n* may not access the channel during the quiet duration periods defined in the quiet message because the channel has been reserved for communications between the wireless access point 230 and the low power wireless devices 210-*m*.

During the first (or a subsequent) quiet duration period as specified in the quiet message, the wireless access point 230 may send a polling schedule to each of the low power wireless devices 210-*m* using the new (second) PHY. The polling schedule may include schedule data that matches the periodic quiet durations set out in the quiet message. The polling schedule may provide time periods for the low power wireless devices 210-*m* to communicate with the wireless access point 230. The polling schedule may also provide instructions for the low power wireless devices 210-*m* are awake at the beginning of a quiet duration. Thus, the polling schedule may ensure that the low power wireless devices 210-*m* awaken such that they can communicate with the wireless access point 230 during the quiet durations.

The polling schedule may be sent using a new PHY. The new PHY may be characterized by a narrower bandwidth of approximately 1-2 MHz and a simple modulation or coding scheme such as, for instance, FSK or GFSK. These characteristics greatly reduce the power requirements and data rates of the low power wireless devices 210-*m* when communicating with the wireless access point 230. The embodiments are not limited to these examples.

During all other periods of time that are not reserved for the low power wireless devices 210-*m*, the wireless access point 230 may communicate over the channel and exchange data with the legacy wireless devices 220-*n*. Such communications may be carried out according to the rules of the 802.11 family of standards that may be in operation on the WiFi network 200. In addition, the low power wireless devices 210-*m* may enter a sleep state during the non-quiet duration time periods further reducing the power requirements of the low power wireless devices 210-*m*. The sleep state does not refer to the base functions performed by the low power wireless devices 210-*m*. The sleep state only refers to communications with the wireless access point 230. Thus, if the low power wireless devices 210-*m* are sensors, they may continue to gather data according to their sensing capabilities while in a sleep state with respect to the wireless access point 230.

When a quiet duration time period commences, the wireless access point 230 may poll the low power wireless devices 210-*m*. The low power wireless devices 210-*m* should be awake as the previously sent polling schedule has specified the quiet durations. The wireless access point 230 may then poll (e.g., request data from) each low power wireless device 210-*m*. Each low power wireless device 210-*m* may respond by sending data it has acquired back to the wireless access point 230 since the last time it was polled. The wireless access point 230 may then forward the data to other devices with which it may communicate.

The WiFi network 200 may then settle into a periodic routine of having the wireless access point 230 poll the low power wireless devices 210-*m* during the quiet durations according to the polling schedule generated using data from the quiet message. At all other times, the wireless legacy devices 220-*n* may utilize the channel for normal 802.11 communications with the wireless access point 230.

Included herein are one or more flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
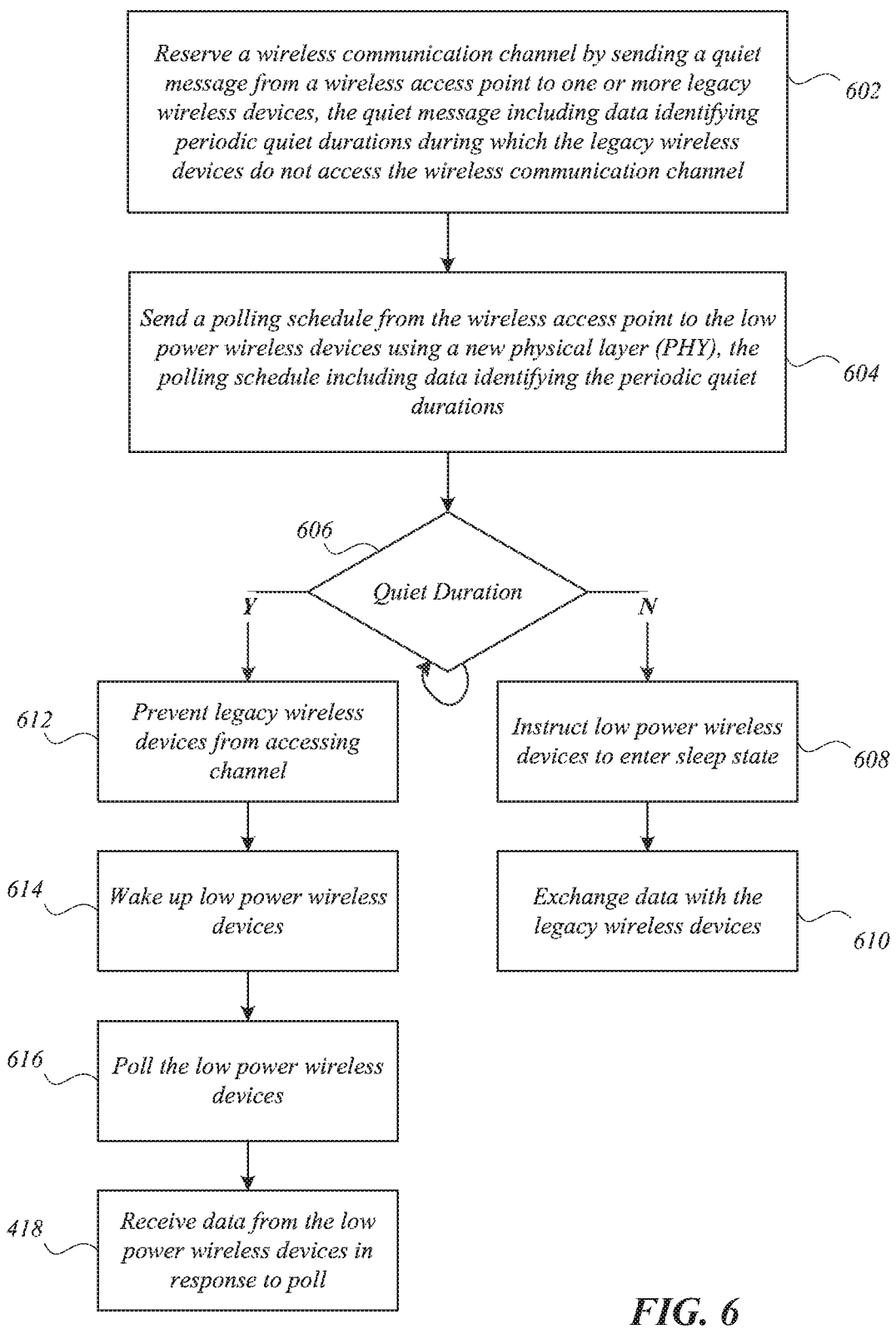
FIG. 6 illustrates one embodiment of a logic flow.

FIG. 6 illustrates one embodiment of a logic flow 600 in which a wireless access point 230 implements process that allows one or more low power wireless devices 210-*m* to efficiently operate on a WiFi network 200. The logic flow 600 may be representative of some or all of the operations executed by one or more embodiments described herein.

A wireless access point 230 may reserve a wireless communication channel by sending a quiet message to one or more legacy wireless devices 220-$n$. The quiet message may include data identifying periodic quiet durations during which the legacy wireless devices 220-$n$ cannot access the wireless communication channel. The wireless access point 230 may send a polling schedule to one or more low power wireless devices 210-$m$. The polling schedule may include data identifying the periodic quiet durations. The wireless access point 230 may then poll the one or more low power wireless devices 210-$m$ during the periodic quiet durations. The low power wireless devices 210-$m$ can exchange data with the wireless access point 230 during the quiet durations. The low power wireless devices 210-$m$ and the legacy wireless devices 220-$n$ can co-exist on the WiFi network 200 even if they use different PHYs because they do not access the channel at the same time.

In the illustrated embodiment shown in FIG. 6, the logic flow may reserve a wireless communication channel at block 602. For example, the wireless access point 230 may send a quiet message to one or more legacy wireless devices 220-$n$. The quiet message may include data identifying periodic quiet durations during which the legacy wireless devices 220-$n$ do not access the wireless communication channel. The embodiments are not limited to this example.

The logic flow 600 may send a polling schedule at block 604. For example, the wireless access point 230 may incorporate the quiet duration data from the quiet message into a polling schedule for each of the low power wireless devices 210-$m$. The polling schedule may be sent to the low power wireless devices 210-$m$ using a new PHY.

The new PHY may include characteristics that significantly reduce the power consumption of the low power wireless devices 210-$m$. For instance, the channel bandwidth may be considerably narrower than the 20 MHz standard channel bandwidth set out in the 802.11 family of standards. In addition, the data rate may be reduced to 2 Mbps which is well below the minimum data rate of 6 Mbps for many in the 802.11 family of standards. A simpler modulation/coding scheme may be utilized for the new PHY to allow for communications over the narrower bandwidth at the reduced data rates. For instance, FSK or GFSK may be used rather than the higher data rate modulation schemes such as Direct Sequence Spread Spectrum (DSSS), Orthogonal Frequency Division Multiplexing (OFDM), Multiple In, Multiple Out Orthogonal Frequency Division Multiplexing (MIMO-OFDM), Binary Phase Shift Keying (BPSK), Differential Binary Phase Shift Keying (DBPSK), Quadrature Phase Shift Keying (QPSK), Differential Quadrature Phase Shift Keying (DQPSK), or 26-State Quadrature Amplitude Modulation (16-QAM). The embodiments are not limited to this example.

The logic flow 600 may determine whether the WiFi network 200 is in a quiet duration at block 606. For example, the wireless access point 230 may determine when a quiet duration begins and ends based on the quiet message and corresponding polling schedule. Depending on whether the WiFi network 200 is in a quiet duration or outside a quiet duration, the wireless access point may perform or cause other components to perform certain activities. The wireless access point 230 continually monitors the WiFi network 200 and may alter its activities based on entering and/or exiting a quiet duration. The embodiments are not limited to these examples.

The logic flow 600 may instruct the low power wireless devices 210-$m$ to enter a sleep state at block 608 if it is determined that the WiFi network 200 is not in a quiet duration. For example, the low power wireless devices 210-$m$ may have already received and processed the polling schedule from the wireless access point 230. The polling schedule includes data indicative of when the low power wireless devices 210-$m$ may use the channel for communications with the wireless access point 230. At all other times, the low power wireless devices 210-$m$ may enter a sleep state with respect to data communications with the wireless access point 230 to conserve power. The sleep state may not affect other functions of the low power wireless devices 210-$m$ that are unrelated to communications with the wireless access point 230. For instance, if a low power wireless device 210-$m$ happens to be a temperature sensor, it will continue to monitor and record temperature readings regardless of whether it is in a sleep state with respect to communicating with the wireless access point 230. The embodiments are not limited to these examples.

The logic flow 600 may exchange data with the legacy wireless devices 220-$n$ at block 610 if it is determined that the WiFi network 200 is in not a quiet duration. For example, the legacy wireless devices 220-$n$ may have already received and processed the quiet message from the wireless access point 230. The quiet message includes data indicative of when the legacy wireless devices 220-$n$ may use the channel for communications with the wireless access point 230. Because the WiFi network 200 is not in a quiet duration, the legacy wireless devices 220-$n$ may carry out normal 802.11 communications with the wireless access point 230. The embodiments are not limited to these examples.

The logic flow 600 may prevent the legacy wireless devices 220-$n$ from accessing the channel at block 612 if it is determined that the WiFi network 200 is in a quiet duration. For example, the legacy wireless devices 220-$n$ may have already received and processed the quiet message from the wireless access point 230. The quiet message includes data indicative of when the legacy wireless devices 220-$n$ may use the channel for communications with the wireless access point 230. Because the WiFi network 200 is in a quiet duration, the legacy wireless devices 220-$n$ may not carry out normal 802.11 communications with the wireless access point 230 because the legacy wireless devices 220-$n$ do not have access to the channel during the quiet durations. The embodiments are not limited to these examples.

The logic flow 600 may wake up the low power wireless devices 210-$m$ at block 614 if it is determined that the WiFi network 200 is in a quiet duration. For example, the low power wireless devices 210-$m$ may have already received and processed the polling schedule from the wireless access point 230. The polling schedule includes data indicative of when the low power wireless devices 210-$m$ may use the channel for communications with the wireless access point 230. When a quiet duration is entered as indicated by the polling schedule, the low power wireless devices 210-$m$ know to wake up to be ready to communicate with the wireless access point 230. The embodiments are not limited to these examples.

The logic flow 600 may poll the low power wireless devices 210-$m$ at block 616 if it is determined that the WiFi network 200 is in a quiet duration. For example, the low power wireless devices 210-$m$ may have awakened and may be ready to communicate with the wireless access point 230 as described above. The wireless access point 230 may then poll each of the low power wireless devices 210-$m$ seeking data that may have been gathered since the last time the low power wireless devices 210-*m* were polled. The embodiments are not limited to these examples.

The logic flow 600 may receive data from the low power wireless devices 210-*m* at block 618 if it is determined that the WiFi network 200 is in a quiet duration. For example, in response to the wireless access point 230 polling, the low power wireless devices 210-*m* may send data back to the wireless access point 230. If a particular low power wireless device 210-*m* is a temperature sensor, for instance, it may return temperature data it has gathered to the wireless access point 230 since the last time it was polled for such data. The wireless access point 230 may then forward the data to one or more other devices with which it can communicate for further processing. The embodiments are not limited to these examples.

Figure 7:
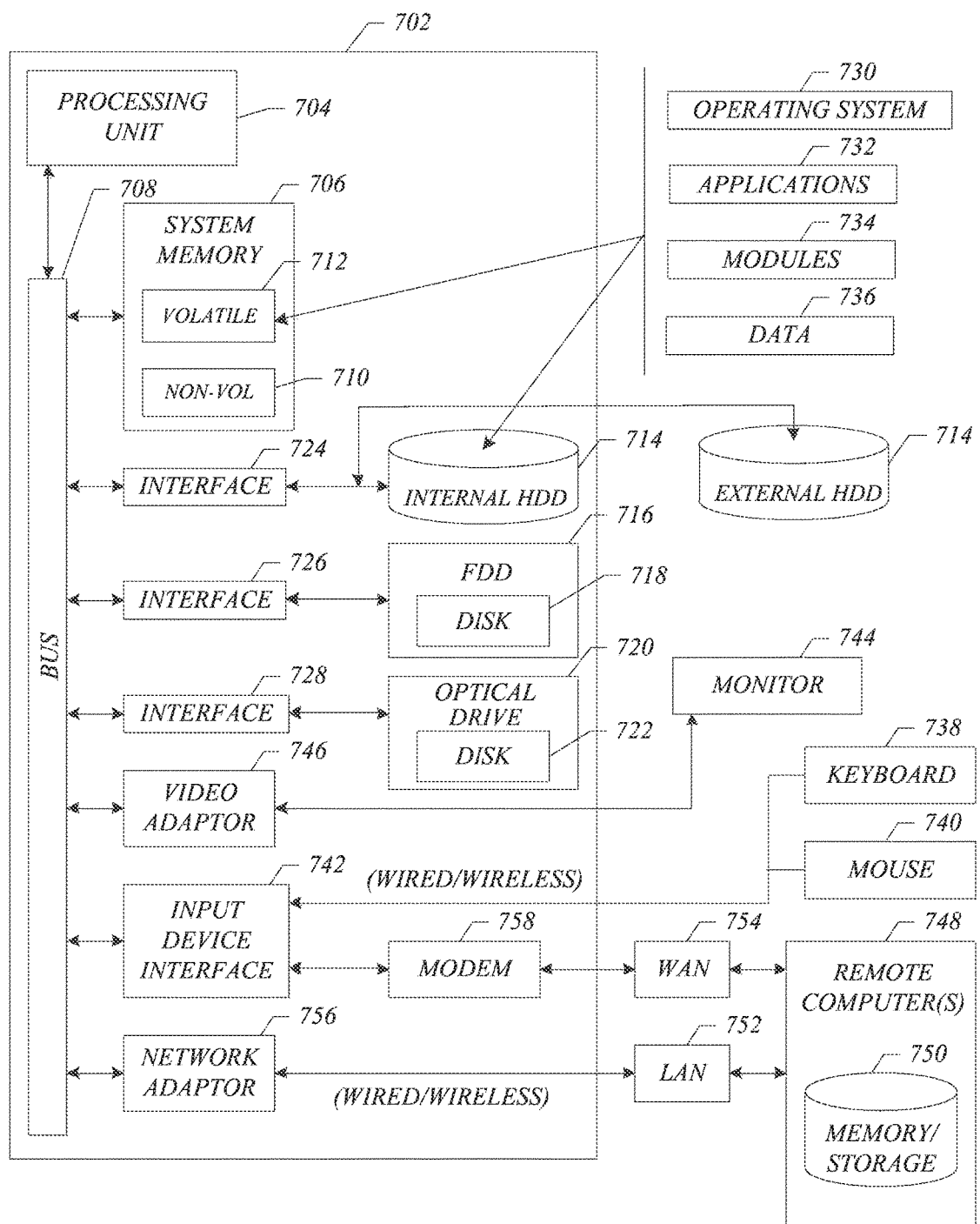
FIG. 7 illustrates an embodiment of an exemplary computing architecture suitable for implementing various embodiments.

FIG. 7 illustrates an embodiment of an exemplary computing architecture 700 suitable for implementing various embodiments as previously described, such as the wireless access point 230, the low power devices 210-*m*, or the legacy wireless devices 220-*n*. As used in this application, the terms "system" and "device" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 700 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 700 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors. Dual microprocessors and other multi-processor architectures may also be employed as the processing unit 704. The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures.

The computing architecture 700 may comprise or implement various articles of manufacture. An article of manufacture may comprise a computer-readable storage medium to store various forms of programming logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of programming logic may include executable computer program instructions implemented using any suitable type of code, such as source code, compiled code, interpreted code, executable code, static code, dynamic code, object-oriented code, visual code, and the like.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1344 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736.

A human operator can enter commands and information into the computer 702 through one or more wire/wireless input devices, for example, a keyboard 738 and a pointing device, such as a mouse 740. Other input devices may include a microphone, an infra-red (IR) remote control, a joystick, a game pad, a stylus pen, touch screen, or the like. These and other input devices are often connected to the processing unit 704 through an input device interface 742 that is coupled to the system bus 708, but can be connected by other interfaces such as a parallel port, IEEE 1344 serial port, a game port, a USB port, an IR interface, and so forth.

A monitor 744 or other type of display device is also connected to the system bus 708 via an interface, such as a video adaptor 746. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Some embodiments may be implemented using various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus comprising:
   a controller;
   memory storing instruction operable on the controller, the instructions, when executed, cause the controller to:
   send a message to one or more devices to reserve a wireless communication channel for one or more other devices, the message including data identifying periodic quiet durations during which the one or more devices cannot access the wireless communication channel;
   send scheduling data to the one or more other devices, the scheduling data identifying the periodic quiet durations; and
   exchange data with the one or more other devices during the periodic quiet durations.

2. The apparatus of claim 1, the message comprising a beacon frame including a quiet element.

3. The apparatus of claim 1, the message comprising a probe response frame including a quiet element.

4. The apparatus of claim 1, the scheduling data sent via a PHY having a channel bandwidth not greater than 2 megahertz (MHz).

5. The apparatus of claim 1, the controller to exchange data with the one or more devices during periods other than the period quiet durations.

6. The apparatus of claim 1, the controller to send the scheduling data comprising information to cause the one or more other devices to awake at a beginning of each quiet duration of the periodic quiet durations.

7. The apparatus of claim 1, the controller to send the scheduling data comprising information to cause the one or more other devices to sleep outside of the periodic quiet durations.

8. The apparatus of claim 1, the one or more other devices comprising low power sensor devices.

9. The apparatus of claim 1, comprising an access point including the controller and the memory.

10. A computer-implemented method, comprising:
    sending, by an access point, a message to one or more devices to reserve a wireless communication channel for one or more other devices, the message including data identifying periodic quiet durations during which the one or more devices cannot access the wireless communication channel;
    sending, by the access point, scheduling data to the one or more other devices, the scheduling data identifying the periodic quiet durations; and
    exchanging, by the access point, data with the one or more other devices during the periodic quiet durations.

11. The computer-implemented method of 10, the message comprising a beacon frame including a quiet element.

12. The computer-implemented method of 10, the message comprising a probe response frame including a quiet element.

13. The computer-implemented method of 10, the scheduling data sent via a PHY having a channel bandwidth not greater than 2 megahertz (MHz).

14. The computer-implemented method of 10, comprising exchanging data with the one or more devices during periods other than the period quiet durations.

15. The computer-implemented method of 10, comprising sending the scheduling data comprising information to cause the one or more other devices to awake at a beginning of each quiet duration of the periodic quiet durations.

16. The computer-implemented method of 10, comprising sending the scheduling data comprising information to cause the one or more other devices to sleep outside of the periodic quiet durations.

17. The computer-implemented method of 10, the one or more other devices comprising low power sensor devices.

18. A non-transitory computer-readable storage medium containing instructions that when executed cause a controller to:
    send a message to one or more devices to reserve a wireless communication channel for one or more other devices, the message including data identifying periodic quiet durations during which the one or more devices cannot access the wireless communication channel;
    send scheduling data to the one or more other devices, the scheduling data identifying the periodic quiet durations; and
    exchange data with the one or more other devices during the periodic quiet durations.

19. The non-transitory computer-readable storage medium of claim 18, the message comprising a beacon frame including a quiet element.

20. The non-transitory computer-readable storage medium of claim 18, the message comprising a probe response frame including a quiet element.

21. The non-transitory computer-readable storage medium of claim 18, the scheduling data sent via a PHY having a channel bandwidth not greater than 2 megahertz (MHz).

22. The non-transitory computer-readable storage medium of claim 18, containing instructions that when executed cause the controller to exchange data with the one or more devices during periods other than the period quiet durations.

23. The non-transitory computer-readable storage medium of claim 18, containing instructions that when executed cause the controller to send the scheduling data comprising information to cause the one or more other devices to awake at a beginning of each quiet duration of the periodic quiet durations.

24. The non-transitory computer-readable storage medium of claim 18, containing instructions that when executed cause the controller to send the scheduling data comprising information to cause the one or more other devices to sleep outside of the periodic quiet durations.

25. The non-transitory computer-readable storage medium of claim 18, the one or more other devices comprising low power sensor devices.

* * * * *